United States Patent
Malinge et al.

(10) Patent No.: US 11,994,424 B2
(45) Date of Patent: *May 28, 2024

(54) METHOD FOR MEASURING AMBIENT LIGHT AND CORRESPONDING INTEGRATED DEVICE

(71) Applicants: STMicroelectronics (Research & Development) Limited, Marlow (GB); STMicroelectronics (Grenoble 2) SAS, Grenoble (FR); STMicroelectronics (Crolles 2) SAS, Crolles (FR)

(72) Inventors: Pierre Malinge, Bernin (FR); Frédéric Lalanne, Bernin (FR); Jeffrey M. Raynor, Edinburgh (GB); Nicolas Moeneclaey, Vourey (FR)

(73) Assignees: STMicroelectronics (Crolles 2) SAS, Crolles (FR); STMicroelectronics (Research & Development) Limited, Buckinghamshire (GB); STMicroelectronics (Grenoble 2) SAS, Grenbole (FR)

( * ) Notice: Subject to any disclaimer, the term of this patent is extended or adjusted under 35 U.S.C. 154(b) by 225 days.

This patent is subject to a terminal disclaimer.

(21) Appl. No.: 17/569,171

(22) Filed: Jan. 5, 2022

(65) Prior Publication Data
US 2022/0155144 A1 May 19, 2022

Related U.S. Application Data

(63) Continuation-in-part of application No. 17/500,432, filed on Oct. 13, 2021.

(30) Foreign Application Priority Data

Nov. 17, 2020 (FR) ........................ 2011768

(51) Int. Cl.
*G01J 1/42* (2006.01)
*G09G 3/3225* (2016.01)
(Continued)

(52) U.S. Cl.
CPC .......... *G01J 1/4204* (2013.01); *G09G 3/3225* (2013.01); *H04N 25/53* (2023.01);
(Continued)

(58) Field of Classification Search
CPC ..... G01J 1/4204; H05B 47/105; H04N 25/53; G09G 3/3225; G09G 2320/0626; G09G 2360/144
See application file for complete search history.

(56) References Cited

U.S. PATENT DOCUMENTS 6,292,528 B1* 9/2001 Wieczorek ............. A61B 6/032
378/98.2
2008/0105944 A1* 5/2008 Chang .................. H01L 21/761
257/E31.037
(Continued)

*Primary Examiner* — Georgia Y Epps
*Assistant Examiner* — Don J Williams
(74) *Attorney, Agent, or Firm* — Slater Matsil, LLP

(57) ABSTRACT

In an embodiment a method for measuring ambient light includes successively synchronizing optical signal acquisition phases with extinction phases of a disruptive light source, wherein the disruptive light source periodically provides illumination phases and the extinction phases, accumulating, in each acquisition phase, photo-generated charges by at least one photosensitive pixel comprising a pinned photodiode, wherein an area of the pinned photodiode is less than or equal to $1/10$ of an area of the at least one photosensitive pixel, transferring, for each pixel, the accumulated photo-generated charges to a sensing node, converting, for each pixel, the transferred charges to a voltage at a voltage node and converting, for each pixel, the transferred charges to a digital number.

21 Claims, 7 Drawing Sheets

(51) Int. Cl.
  *H04N 25/53*      (2023.01)
  *H05B 47/105*     (2020.01)

(52) U.S. Cl.
  CPC ... *H05B 47/105* (2020.01); *G09G 2320/0626* (2013.01); *G09G 2360/144* (2013.01)

(56)          References Cited

U.S. PATENT DOCUMENTS

2020/0341512 A1    10/2020  Shao et al.
2022/0003686 A1     1/2022  Flot et al.
2022/0155143 A1 *   5/2022  Moeneclaey ......... G01J 1/4204
2022/0155144 A1     5/2022  Malinge et al.

* cited by examiner

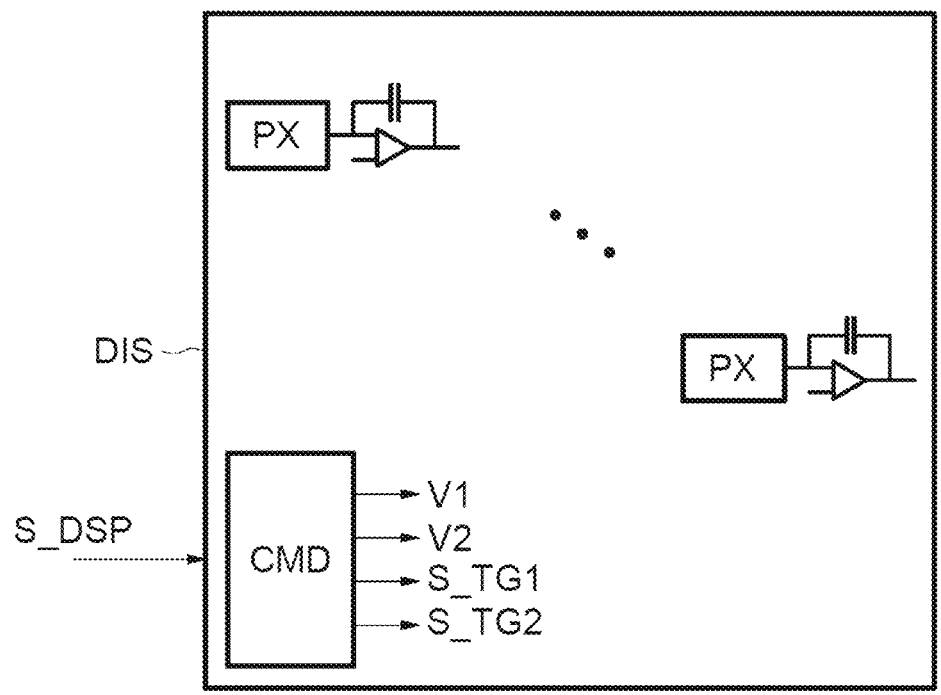

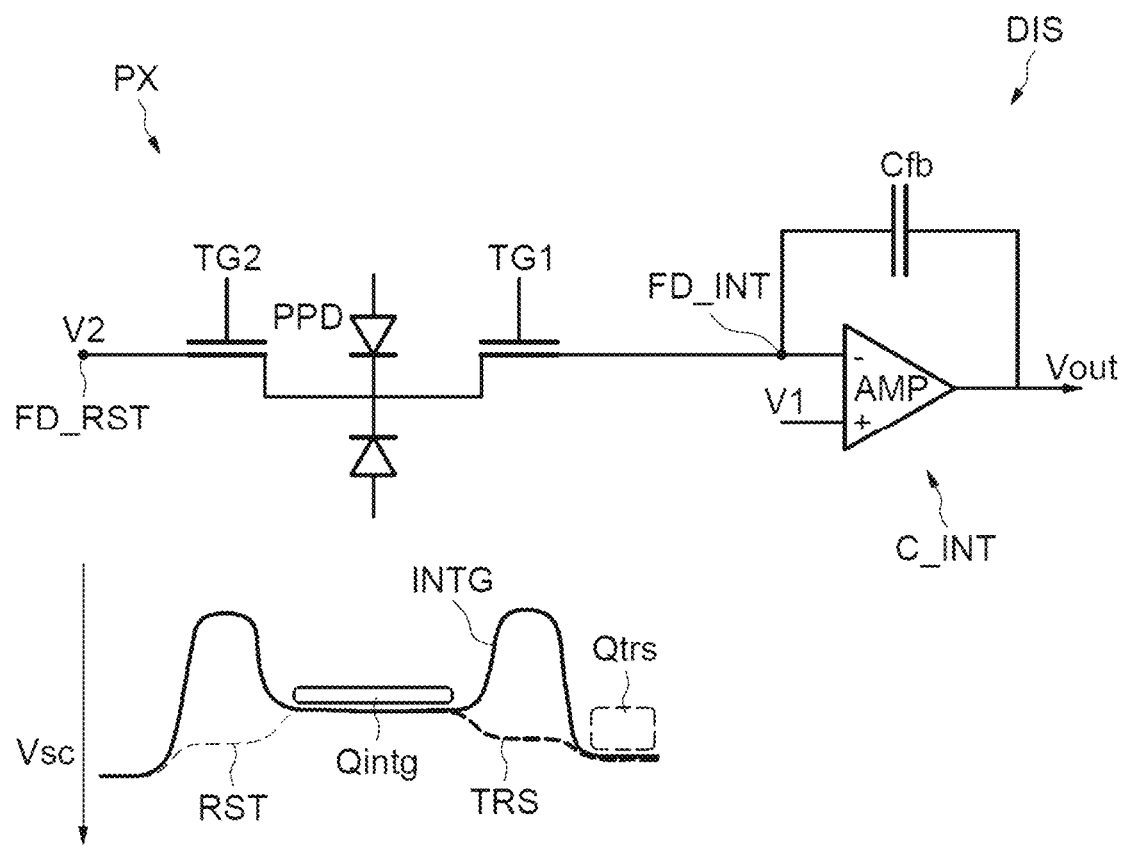

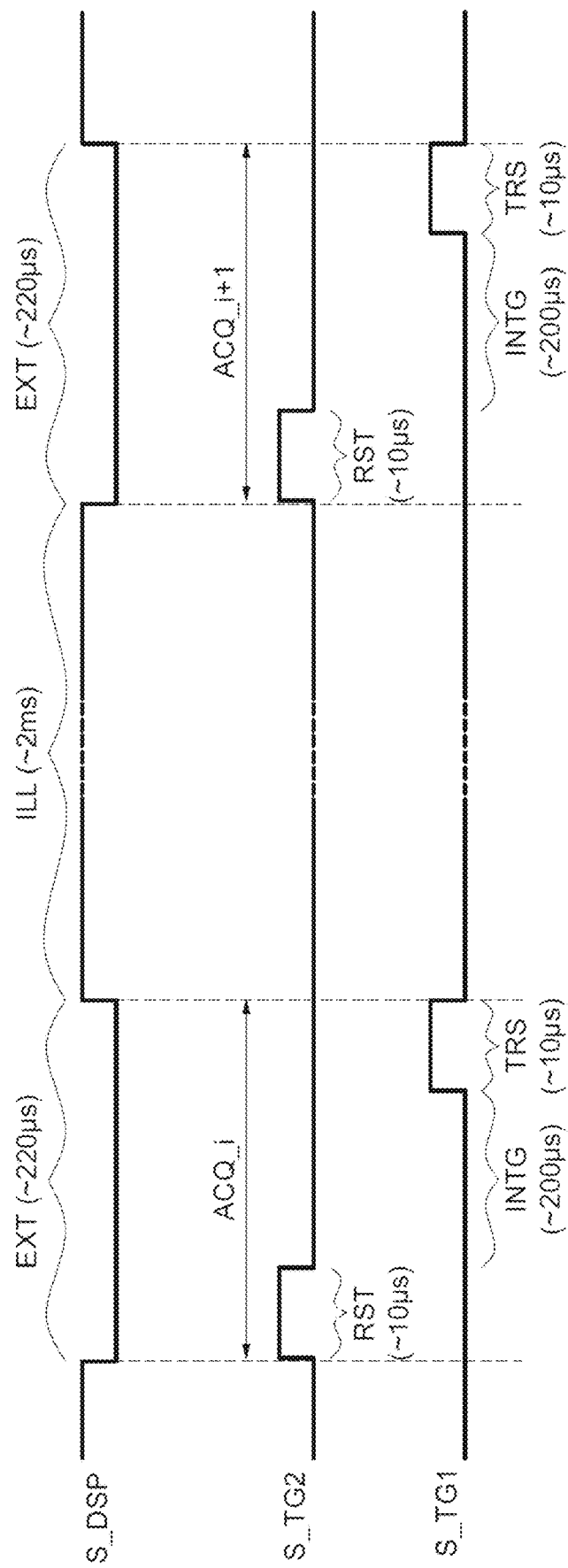
[Fig. 3]

[Fig 4]
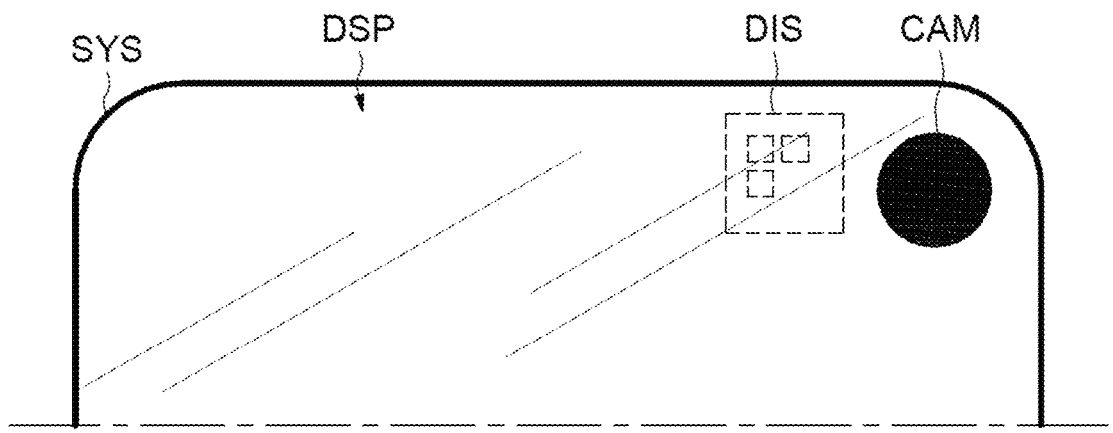

[Fig 5]
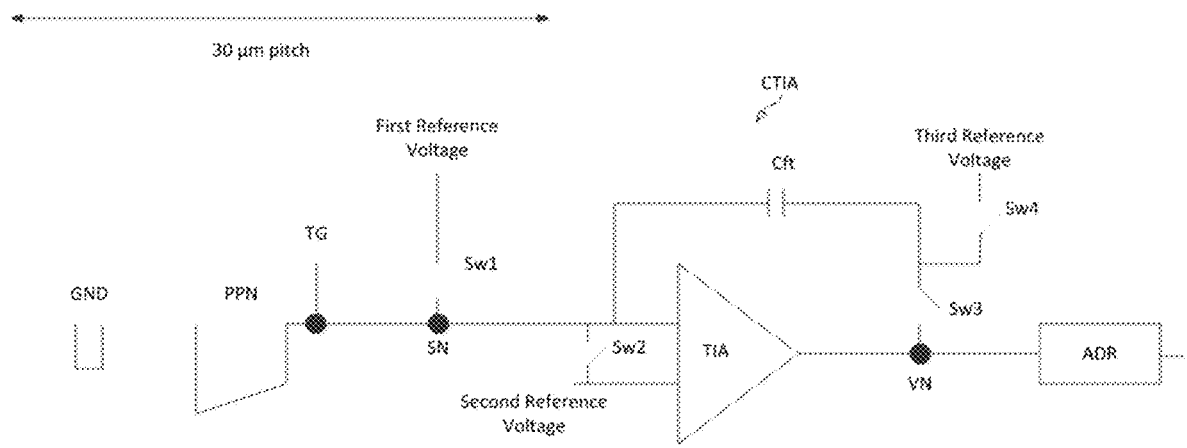

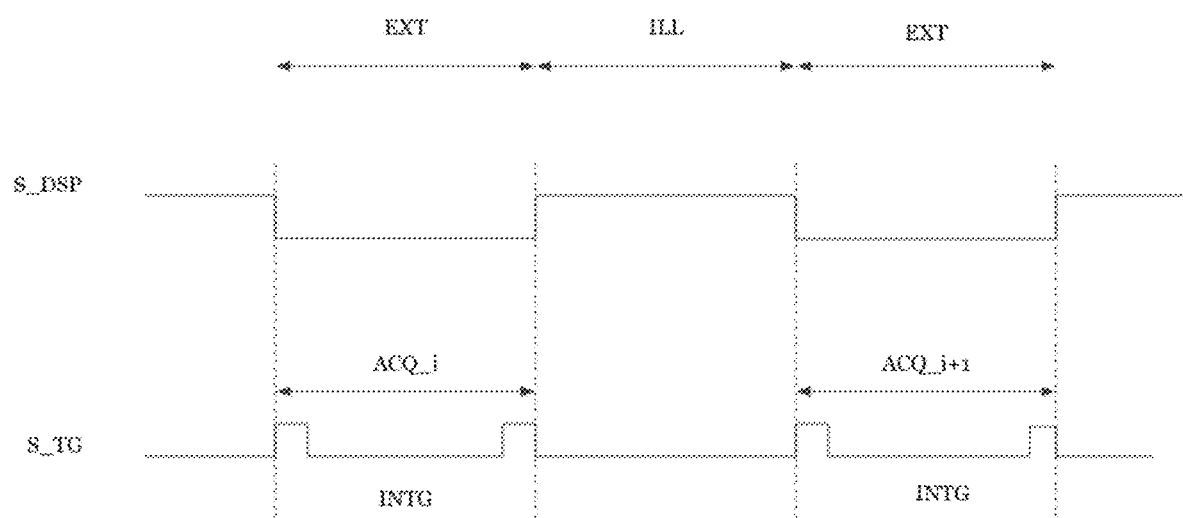
[Fig 6]

[Fig 7]
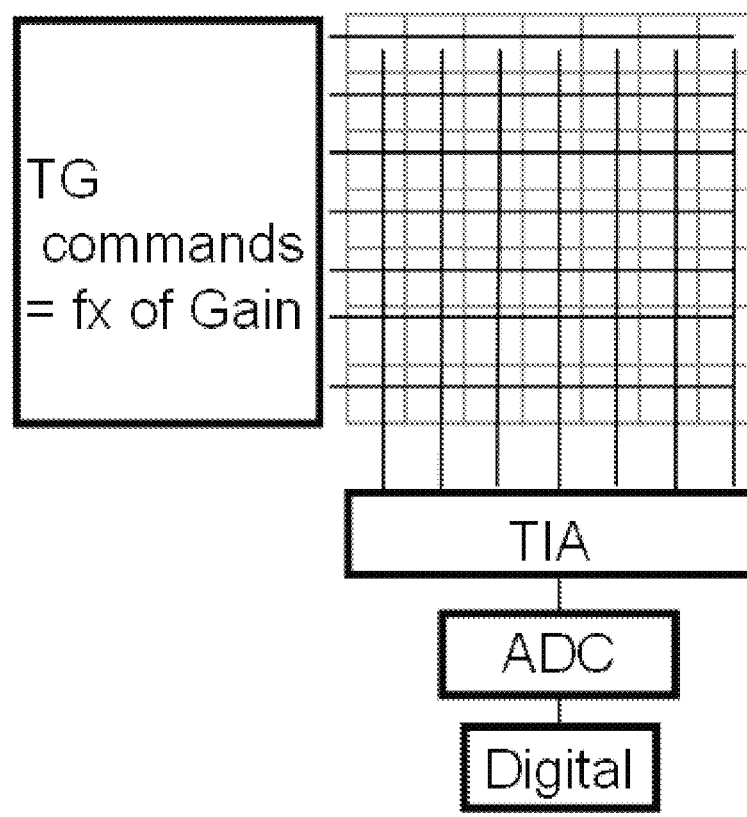

METHOD FOR MEASURING AMBIENT LIGHT AND CORRESPONDING INTEGRATED DEVICE

CROSS-REFERENCE TO RELATED APPLICATIONS

This application is a continuation-in-part of U.S. Application Ser. No. 17/500,432, filed on Oct. 13, 2021, which claims the benefit of French Application No. 2011768, filed on Nov. 17, 2020, which applications are hereby incorporated herein by reference.

TECHNICAL FIELD

Implementations and embodiments relate to measurements of ambient light, commonly known as "Ambient Light Sensing" (ALS).

BACKGROUND

Ambient light measurements are usually implemented for display devices, such as television screens or multifunction mobile phones (or "smartphones"), in order to adapt the intensity of the light emitted by the display to the brightness of the environment thereof.

Ambient light sensing devices typically include photodetectors comprising a photodiode controlled by an MOS transistor type switch (acronym of the term "Metal Oxide Semiconductor" well-known to a person skilled in the art).

An integration constraint of ambient light sensing devices has emerged with the design of multifunction mobile phones having a screen occupying practically all of the surface area of use, and not leaving any free space for integrating ambient light sensing devices.

Conventional ambient light sensing devices can be integrated behind the display screen, but then the light measurement is impeded by the light of the screen which masks the ambient optical signal of the environment.

In fact, this problem exists once the ambient light sensing device itself generates a disruptive light that can be added to the ambient light in the field of view of the photodetectors of the ambient light sensing device.

Filtering the resulting signals can be very difficult and typically gives rise to a significant loss of precision.

In this regard, it is proposed firstly to control successive ambient light sensing acquisition phases synchronized with periodic disruptive light source extinction phases. The measurements resulting from a series of such successive acquisition phases are integrated, such that the accumulated total thereof supplies a complete ambient light measurement.

That being said, in conventional devices, MOS transistor switching introduces non-negligible thermal noise ("kT/C noise") with respect to the intensity of the signal generated, at each acquisition of the series, and the noise is furthermore accumulated during successive integrations.

SUMMARY

Embodiments provide to control successive ambient light sensing acquisition phases synchronized with periodic disruptive light source extinction phases. The measurements resulting from a series of such successive acquisition phases are integrated, such that the accumulated total thereof supplies a complete ambient light measurement.

Further embodiments provide acquisition phases, each comprising an accumulation of charges photogenerated by at least one photosensitive pixel including a pinned diode, and a transfer of the accumulated photogenerated charges to an integration node.

According to one embodiment, a method for measuring ambient light is proposed working together with a disruptive light source periodically controlled in illumination phases and extinction phases. The method comprises successive optical signal acquisition phases synchronized with disruptive light source extinction phases. Each acquisition phase comprises an accumulation of charges photogenerated by at least one photosensitive pixel including a pinned photodiode, and a transfer of the accumulated photogenerated charges to an integration node. And, the method comprises, for each pixel, an integration of the charges transferred to the integration node during a series of successive acquisition phases.

Typically, a pinned photodiode, or depleted photodiode, comprises for example two p-n junctions in a semiconductor substrate arranged such that the two respective space charge zones join and form a common completely depleted cathode region at the two junctions. The cathode region is accordingly adapted to store an accumulation of the photogenerated charges.

Thus, a transfer of the photogenerated charges in a pinned photodiode introduces no noise and the series of successive acquisition phases synchronized with the disruptive light source extinction phases induces, after integration, a precise, noise-free signal.

In particular, a distinction is made between a mechanism for transferring accumulated charges in a pinned photodiode and a mechanism for conducting a current drawn by a photodiode via a transistor in the on-state.

Indeed, the conduction mechanism via the resistor in the on-state of the transistor introduces "kTR" thermal noise (the expression "kT/C noise" originating from the simplification of the "R" component by the expression of an impedance in "1/RC"), whereas the mechanism for transferring accumulated loads in a pinned photodiode, which is not a current conduction, is not subject to thermal noise.

For example, the transfer of the photogenerated charges to the integration node comprises a lowering of an electrostatic potential barrier enabling diffusion of the photogenerated charges to the integration node.

According to an embodiment, each acquisition phase starts with a reset discharging said at least one pixel of parasitic charges accumulated outside said acquisition phase.

Advantageously, the reset comprises a lowering of an electrostatic potential barrier enabling diffusion of the parasitic charges to a reset node.

Indeed, outside the acquisition phases, photosensitive pixels can accumulate parasitic charges derived particularly from the disruptive light source.

According to an embodiment, the method comprises a reception of an external control signal representative of the disruptive light source extinction phases, and the acquisition phases are synchronized with the external control signal extinction phase commands.

In other words, in this embodiment, the method works together with the disruptive light source by sharing the disruptive light source control signal, and this is possible particularly in the case where the ambient light sensing device and the disruptive light source are integrated in the same device, such as a multifunction mobile phone. That being said, the external control signal can drift from the signal actually controlling the disruptive light source, and at least generated to be representative of the extinction phases.

According to a further embodiment, an integrated ambient light sensing device is proposed, adapted to work together with a disruptive light source periodically controlled in illumination phases and extinction phases.

The device includes at least one photosensitive pixel comprising a pinned photodiode, an integrator circuit for each photosensitive pixel, and control means configured to set the pace of the successive optical signal acquisition phases synchronized with the disruptive light source extinction phases, and to control, in each acquisition phase, an accumulation of photogenerated charges by said at least photosensitive pixel, and a transfer of the accumulated photogenerated charges to an integration node of the integrator circuit, the integrator circuit being configured to integrate the charges transferred to the integration node during a series of successive acquisitions.

According to an embodiment, each pixel includes a transfer gate between the pinned photodiode and the integration node, and the control means are configured to control the transfer of the photogenerated charges by generating a potential on the transfer gate adapted to lower an electrostatic potential barrier and enable diffusion of the photogenerated charges to the integration node.

According to an embodiment, the control means are configured to control, at the start of each acquisition phase, a reset discharging said at least one pixel of parasitic charges accumulated outside said acquisition phase.

Advantageously, each pixel includes a second transfer gate between the pinned photodiode and a reset node, and the control means are configured to control the reset by generating a potential on the second transfer gate adapted to lower an electrostatic potential barrier and enable diffusion of the photogenerated charges to the reset node.

According to an embodiment, the device comprises an input adapted to receive an external control signal representative of the disruptive light source extinction phases, and the control means are configured to set the pace of the acquisition phases in a synchronized manner with the external control signal extinction phase commands.

According to a further aspect, a system, such as a multifunction mobile phone, includes a light-emitting display screen and an ambient light sensing device as defined above, the light-emitting display screen being the disruptive light source and being located in the field of view of the pixels of the ambient light sensing device.

BRIEF DESCRIPTION OF THE DRAWINGS

Further advantages and features will emerge on studying the detailed description of embodiments and implementations, in no way exhaustive, and of the appended drawings wherein:

FIG. 1 shows an integrated ambient light sensor device;

FIG. 2 shows a photosensitive pixel and an integrator circuit according to a first embodiment;

FIG. 3 shows the generation of control signals setting the pace of the acquisition phases according to the first embodiment;

FIG. 4 illustrates an example of an integrated ambient light sensor device;

FIG. 5 shows a photosensitive pixel and an integrator circuit according to a second embodiment;

FIG. 6 shows the generation of control signal setting the pace of the acquisition phases according to the second embodiment; and FIG. 7 shows an array of pixels and related circuitry.

DETAILED DESCRIPTION OF ILLUSTRATIVE EMBODIMENTS

FIG. 1 represents an integrated ambient light sensor (AIS) device DIS.

The device DIS includes an array of at least one photosensitive pixel PX, usually comprising however some tens of pixels, for example, between 1 and 50 pixels.

In the context of ambient light measurement, each pixel PX is for example intended to detect a so-called "multispectral" component of the incident optical signal, in particular by means of respective optical filters. The multispectral components can include the primary colors of the visible spectrum, i.e. red, green and blue, but also other non-primary colors, the entire visible spectrum (white light) and optionally infrared and ultraviolet components.

Each pixel PX is coupled with a respective integrator circuit C_INT as described hereinafter with reference to FIG. 2.

The device DIS further includes control means CMD configured to generate control signals to implement the functionalities of the device DIS, i.e., in particular an acquisition of the incident optical signal, reading and processing the photogenerated signals, and converting the signals into digital data that can be used by a user.

Of the control signals generated by the controller or control means CMD, voltage signals V1, V2, S_TG1, S_TG2 are generated in particular to set the pace of the acquisition phases, and distributed in the pixels PX as described hereinafter with reference to FIGS. 2 and 3.

The control means CMD are for example embodied materially by a state machine type logic circuit.

Further, the device DIS is envisaged to work together with a disruptive light source generating a parasitic optical signal in the detection field of the pixels.

In particular, the disruptive light source provides periodically illumination phases ILL (FIG. 3, FIG. 6) and extinction phases EXT (FIG. 3, FIG. 6).

The disruptive light source DSP (FIG. 4) can be controlled by a system SYS (FIG. 4) also including the ambient light sensing device DIS.

In order to measure the ambient light in conjunction with the disruptive light source, the device DIS comprises, for example, an input adapted to receive an external control signal S_DSP, representative of the illumination phases and extinction phases of the disruptive light source.

This enables the control means CMD to set the pace of the acquisition phases ACQ_i in a synchronized manner with the commands of the extinction phases EXT of the external control signal S_DSP in the manner described hereinafter with reference to FIGS. 3 and 6.

Reference is now made to FIG. 2.

FIG. 2 illustrates schematically the circuit of a photosensitive pixel PX and an integrator circuit C_INT belonging to the integrated ambient light sensing device DIS described with reference to FIG. 1.

The pixel PX comprises a pinned photodiode PPD, or depleted photodiode, formed by two bipolar p-n junctions in a semiconductor substrate, for example, by means of an n-type box formed in a p-type substrate, and a p-type surface layer. The two bipolar p-n junctions are arranged such that the two respective space charge zones join and form a common completely depleted cathode region (or anode region, for inverted conductivities) at the two junctions, when the photodiode is idle in a reset state. The common cathode (or anode) region is accordingly adapted to collect and accumulate the photogenerated charges.

The pixel further includes a transfer gate TG1, i.e. in brief a transistor gate, between the cathode region of the pinned photodiode PPD and a floating diffusion node FD_INT, referred to as integration node.

The integration node FD_INT includes for example an n-type doped region enabling electrical coupling with the integrator circuit C_INT, for example, by an ohmic contact.

The integrator circuit C_INT can typically include an operational amplifier AMP, the output thereof is looped back to the inverting input (−) via a capacitive feedback element Cfb, wherein the follower input (+) is brought to a reference potential V1 generated by the control means CMD.

Thus, the currents or the quantities of charges injected onto the inverting input (−) are stored directly by the capacitive element Cfb, and a voltage output signal Vout results from the integrations thereof by the conventional mechanism known per se of this type of integrator circuit C_INT. It will also be noted that the inverting input (−) in this assembly is "virtually" at the potential V1.

The inverting input (−) of the operational amplifier AMP is coupled with the integration node FD_INT, for example by ohmic contact.

Moreover, the pixel PX includes a second transfer gate TG2, between the cathode region of the pinned photodiode PPD and a second floating diffusion node FD_RST, referred to as reset node FD_RST.

The reset node FD_RST is brought to a potential V2 generated by the control means CMD.

Electrostatic potential curves Vsc in the semiconductor regions of the different elements FD_RST, TG2, PPD, TG1, FD_INT of the pixel PX are represented under the electrical diagram of the pixel PX.

The x-axis (horizontally in the orientation of FIG. 2) of the electrostatic potential curves Vsc corresponds to the position, vertically aligned, of the different elements FD_RST, TG2, PPD, TG1, FD_INT of the electrical diagram of the pixel PX.

The solid-line curve corresponds to charge photogeneration INTG conditions, and the dotted-line parts correspond to the changes in the electrostatic potential under charge transfer TRS and reset RST conditions.

Under the charge photogeneration INTG conditions, the first transfer gate TG1 and the second transfer gate TG2 are brought to a zero or negative potential, creating potential barriers framing the pinned photodiode PPD.

Thus, photogenerated charges Qintg are located and stored in the cathode region of the pinned photodiode PPD, framed by the potential barriers.

Under the charge transfer TRS conditions, the first transfer gate TG1 is brought to a positive potential adapted to lower the potential barrier between the pinned photodiode PPD and the integration node FD_INT so as to enable a transfer of photogenerated charges Qintg by diffusion to the lowest level.

In this regard, the voltage V1, reverberated on the inverting input of the amplifier AMP of the integrator circuit C_INT, is generated such that the level of the integration node FD_INT is the lowest. The voltage V1 is for example substantially 1.8V.

Thus, the charges transferred Qtrs to the integration node FD_INT are integrated by the integrator circuit C_INT and converted to output voltage Vout. The first transfer gate TG1 can then be returned to the initial potential, zero or negative, in order to raise the potential barrier between the pinned photodiode PPD and the integration node FD_INT.

Under the reset RST conditions, the second transfer gate TG2 is brought to a positive potential adapted to lower the potential barrier between the pinned photodiode PPD and the reset node FD_RST so as to enable a transfer of photogenerated charges Qintg by diffusion to the reset node FD_RST, at the lowest level set by the signal V2. The voltage V2 is, for example, substantially 2.5V.

Similarly to the transfer mechanism TRS, the photogenerated charges diffuse to the reset node FD_RST, this time in order to be discharged from the pixel PX.

Given that the pinned photodiode PPD is completely depleted, no mobile charge is present in the photodiode after the reset RST, and the reset mechanism RST introduces no noise, i.e. no parasitic residual charge.

As is usual in the field of semiconductors and known to a person skilled in the art, the term "potential barrier" denotes a vicinity of a local maximum of electrostatic potential of a charged particle. Thus, the absolute levels of a potential barrier are dependent on the sign the charge of the charged particle. If the photogenerated particles are positively charged, a potential barrier corresponds to a local maximum of the electrostatic potential, whereas if the photogenerated particles are negatively charged, a potential barrier corresponds to a local minimum of the electrostatic potential. And, with terms such as "low(est) level" and "raise the level", the level of the electrostatic potential energy of a charge particle is considered.

The orientation of the axis of electrostatic potential Vsc thus corresponds to a photogeneration of charges of negative sign, i.e. electrons, which is the case of a pnp-type pinned photodiode. That being said, photogeneration of charges of positive sign, i.e. holes, in the case of an npn-type pinned photodiode could be perfectly envisaged as an alternative to the examples described with reference to FIGS. 2 and 3, with particularly with adapted polarization commands.

Reference is now made to FIG. 3.

FIG. 3 temporally illustrates the generation, by the control means CMD, of the control signals setting the pace of the acquisition phases ACQ_i, ACQ_i+1 of an incident optical signal by the pixel PX described with reference to FIG. 2.

The control means CMD receive the external control signal S_DSP, controlling the illumination phases ILL and the extinction phases EXT of the disruptive light source DSP (FIG. 4).

The external control signal S_DSP is not necessarily the effective control of the disruptive light source, but is at least representative of the extinction phases EXT, for example, communicated by the low levels of the signal S_DSP. Other ways of communicating the information of the extinction phases EXT by the external control signal S_DSP could be envisaged in the context of the cooperation between the ambient light sensing device DIS and the disruptive light source (DSP).

A first control signal S_TG1 corresponds to the potential applied on the first transfer gate TG1, and a second control signal S_TG2 corresponds to the potential applied to the second transfer gate TG2.

The high levels of the first control signal S_TG1 and the second control signal S_TG2 are adapted to lower the potential barrier located respectively between the pinned photodiode PPD and the integration node FD_INT and between the pinned photodiode PPD and the reset node FD_RST. The low levels are adapted to enable or to form the respective potential barriers.

The control means CMD are configured to synchronize successive acquisition phases ACQ_i, ACQ_i+1 with the successive extinction phases EXT of the disruptive light source.

Each acquisition phase ACQ_i, ACQ_i+1 advantageously starts with a reset RST controlling a lowering of the electrostatic potential barrier between the pinned photodiode PPD and the reset node FD_RST, by means of the second control signal S_TG2.

Thus, parasitic charges accumulated before the acquisition phase ACQ_i, ACQ_i+1 can be discharged by diffusion to the reset node FD_RST.

Then, charge photogeneration INTG takes place in the pinned photodiode PPD, by excitation of the incident optical signal.

Given that the disruptive light source is extinguished EXT during photogeneration, the incident optical signal is a correct representative of the ambient light.

Furthermore, the pinned photodiode PPD having advantageously been drained of the parasitic charges, the photogenerated charges are accumulated in the photodiode PPD from a blank and noise-free reference.

Following the photogeneration INTG, the photogenerated charges are transferred TRS by a lowering of the electrostatic potential barrier between the pinned photodiode PPD and the integration node FD_INT, by means of the first control signal S_TG1.

The acquisition phase ACQ_i is thus synchronized with an extinction phase EXT of the disruptive light source, and is adapted to the time available during the extinction phase EXT.

Thus, considering that the reset and the transfer last substantially 1ops (microseconds) each, if the extinction phase ECT offers a window of a duration of substantially 220 μs, then the photogeneration phase can be activated for a duration of substantially 200 μs.

For such a duration, the quantity of photogenerated charges can correspond to a few femtoamperes (fA) i.e. of the order of 10-15 A, if the ambient light is low.

Such a charge quantity is too low to constitute a measurement representatively the ambient light, and a series of the order of around one hundred acquisition phases ACQ_i, ACQ_i+1 are controlled successively during around one hundred successive extinction phases EXT, the integrations of the transferred charges on the integration node during each acquisition phase ACQ_i, ACQ_i+1 of the series making it possible to constitute by accumulation a complete measurement of the ambient light.

This corresponds to an accumulative exposure time of substantially 20 ms (milliseconds).

In the case where the illumination phases ILL have a duration of the order of for example 2 ms, the total time to make the ambient light measurement during a series of extinction phases EXT is substantially 220 ms, which is fully tolerable in terms of human sensitivity, and in view of the typically slower variations of ambient light.

FIG. 4 illustrates an advantageous example of application of the integrated ambient light sensing device DIS described above with reference to FIGS. 1 to 3, in an electronic system SYS.

The system SYS is for example an electronic device such as a multifunction mobile phone, a touchscreen tablet, or a laptop computer, and particularly includes a light-emitting display screen DSP, the ambient light sensing device DIS, as well as a photographic camera CAM.

A commercial advantage is found in this type of device when the light-emitting display screen DSP occupies all or almost all of the surface area whereon it is mounted, to the point of not providing a free space capable of accommodating the ambient light sensing device DIS. A circular opening, provided to integrate the photographic camera CAM on the front of the screen, is detrimental to this advantage but is nonetheless tolerated.

This type of structure is for example permitted by organic light-emitting diode (OLED) technology.

The ambient light sensing device DIS must for its part be integrated behind the screen DSP, and have in the field of view thereof the organic light-emitting diodes OLED, emitting an intense light signal, not part of the ambient light.

Accordingly, the light-emitting display screen DSP is a disruptive light source for the ambient light sensing device DIS.

OLED display screens, as well as conventional "LED" light-emitting display screens, always generate the light signal via flickering imperceptible to the human eye. In other words, the active OLED or LED display screens are controlled periodically in the illumination phases ILL and extinction phases EXT.

The ambient light sensing device DIS being adapted to work together with the disruptive light source DSP in the manner described above with reference to FIGS. 1 to 3, can accurately measure the ambient light, particularly free from electronic noise or optical noise, during the successive acquisition phases ACQ_i, ACQ_i+1 synchronized with the extinction phases EXT of the display screen DSP, for example of "LED" or "OLED" technology.

FIG. 5 illustrates schematically the circuit of a photosensitive pixel PX and a transimpedance amplifier TIA belonging to the integrated ambient light sensing ALS device DIS according to an embodiment and similar to the one described with reference to FIG. 1.

The pixel PX comprises a pinned photodiode PPD or a depleted photodiode, as described, for example, with respect to FIG. 2. However, instead of covering almost the entire pitch area of the pixel PX the pinned photodiode PPD in this embodiment covers only a small fraction of that area. The small fraction of the area may be about less than or equal to ⅟100, less than or equal to ⅟80 or less than or equal to ⅟50, or between about ⅟200 and ⅟100, between about ⅟80 and ⅟50 or between about ⅟30 and ⅟10 of the pixel area. For example, the pitch area of the pixel PX may be 30 μm×30 μm and the area of pinned photodiode PPD may be 3.75 μm×3.75 μm.

Such a pinned photodiode PPD may be an island pinned photodiode PPD. The island pinned photodiode PPD may generate advantageously less dark current than the pinned photodiode PPD as described in FIG. 2 and almost the same sensitivity. The sensitivity of the island pinned photo diode PPD may be about the same as the pinned photo diode because photons which pass outside the active area of the island photodiode PPD (but within the area of the pixel PX) may still be collected via random diffusion (sometimes guided by implants providing an electrical field) in the active area of the pinned photodiode PPD. Accordingly, the island photo diode PPD may have a slightly lower quantum efficiency (QE) compared to the pinned diode PPD of FIG. 2 but a much lower capacitance (CPD) which improves the signal to noise ratio (SNR).

Moreover, the pinned photo diode PPD may only have one transfer gate TG instead of two. As shown in FIG. 5, the pinned photo diode PPD is connected via the transfer gate TG to a sensing node SN. The sensing node SN in turn is connected via a switch Sw1 to a first reference potential and to a first input of a transimpedance amplifier TIA. The second input of the transimpedance amplifier TIA is connected to a second reference potential. The first input of the transimpedance amplifier TIA may be connected to the second input of the amplifier TIA via a second switch Sw2.

A capacitance loop is looped around the amplifier TIA thereby forming a CTIA. The capacitance loop is electrically connected either via a third switch Sw3 to a potential node PN in which an output of the amplifier TIA and the loop meet or to a third reference potential via a fourth switch Sw4. A feedback element Cft is placed in the capacitance loop. The potential node PN is connected to an analog digital converter ADC such as a 13 bit ADC.

The pinned photodiode PPD does not act as an electrical device but rather as a physical device. In other words, the pinned photo diode PPD collects electrons generated by impinging photons in the pixel PX (whether inside the active area of the pinned photo diode PPD or outside that area) in a collection tank.

The looped transimpedance amplifier CTIA is configured to convert an input current (charges) into a voltage. The capacitive element Cft may be the element doing the conversion but it needs the transimpedance amplifier TIA to maintain the input at the second reference voltage. The output voltage (at the potential node PN) may be proportional to the input current. The transimpedance amplifier TIA has a low input impedance and a low output impedance. The transimpedance amplifier TIA may comprise an operational amplifier and a feedback resistor. Instead of a transimpedance amplifier TIA an equivalent device can be used for converting an input current to a voltage.

The feedback element Cft may have a small capacitance such as less than 100 fF, less than 80 fF, or less than 60 fF, or a capacitance in between 50 fF and 100 fF inclusive or in between 50 fF and 60 fF. In a particular example the feedback element Cft has a capacitance of 56 fF. The feedback element Cft may be a linear capacitor. In various embodiments the feedback element Cft is metal oxide metal (MOM) capacitor.

The converter ADC is configured to convert the voltage at the potential node PN in a digital number or digital signal. The converter ADC may be a 13-bit converter, i.e., it may convert the voltage at the potential in a 13 bit number. Alternatively, converters ADC with other bit number conversions can be applied.

FIG. 6 shows a timing diagram of control signals for the embodiment of FIG. 5.

FIG. 6 illustrates generating, by the control means CMD, temporal control signals S_DSP and S_TG setting the pace of the acquisition phases ACQ_i, ACQ_i+1 of an incident optical signal by the pixel PX described with reference to FIG. 5.

The control means CMD receive the external control signal S_DSP, controlling the illumination phases ILL and the extinction phases EXT of the disruptive light source DSP (FIG. 4). The control means CMD are configured to synchronize successive acquisition phases ACQ_i, ACQ_i+1 with the successive extinction phases EXT of the disruptive light source. The control signal S_TG corresponds to a potential applied on the transfer gate TG.

In a first step the pinned photodiode PPD is reset via (a pulse of) the control signal S_TG. Since the pinned photodiode PPD constantly collects electrons from impinging photons in the collection tank, the pinned photodiode PPD needs to be reset (i.e., the tank needs to be emptied) before ambient light can be measured. The tank is emptied by applying a first pulse (setting control signal S_TG to high) to the gate of the transfer gate TG and to the first switch Sw1 at the same time so that the pinned photodiode PPD is shorted via the closed first switch Sw1 to the first reference potential. The first reference potential may be set at 1.5 V. Alternatively, the first reference potential may be selected from a potential between 1V and 2 V, inclusive. In this period the electrons which have been assembled in the tank of the pinned photodiode PPD are removed from the tank and travel to the first referenced voltage. The transimpedance amplifier TIA is turned off during this time. The first pulse of the control signal S_TG starts at the beginning of the extinction phase EXT and may last 1 or a few microseconds (such as 1 µs, 2 µs, 3µ, etc.).

In the second step, the potential at the gate of the transfer gate TG and the first switch Sw1 is set to low (first pulse is over) by the control signal S_TG during the extinction phase EXT. The transfer gate TG and the first switch Sw1 are open and no electron to be collected at the tank of the pinned photodiode PPD can leave that tank. The control signal S_TG is set to low for an extended time period, e.g., between about 100 µs and 200 µs such as about 150 µs. During this time period the pinned photodiode PPD measures the ambient light by accumulating electrons in the tank based on photons impinging on the pixel PX. The external control signal S_DSP and therefore the extinction phase EXT (and the related acquisition phase ACQ_i, ACQ_i+1) and the illumination phase ILL may depend on the light source (e.g., screen lighting of an OLED) used and integrated in the system SYS.

In the third step, the potential at the gate of the transfer gate TG is set to high again by the control signal S_TG (second pulse) at the end of the extinction phase EXT. At this time the integrated (accumulated) electrons in the tank of the pinned photodiode PPD are transferred out via the sensing node SN towards the amplifier TIA, which is turned on at about the same time, and the capacitive element Cft (the looped amplifier CTIA). The end of the second pulse of the control signal S_TG may be synchronized with the end of the extinction phase EXT (and the beginning of the illumination phase ILL). The second pulse of the control signal S_TG may last 1 or a few microseconds (such as 1 µs, 2 µs, 3µ, etc.). The transfer of the electrons from the pinned photodiode PPD to the sensing node SN does advantageously not generate a sampling noise kT/C.

The first switch Sw1 is still open so that the pinned photodiode PPD is not shorted to the first reference potential. The electrons accumulate at the capacitive element Cft and provide in interplay between the amplifier TIA and the capacitive element Cft a voltage at the potential node PN representative of the electrons collected in the tank of the pinned photodiode PPD. The third switch Sw3 is closed during this time in order to provide an electrical connection between the capacitive element Cft and the potential node PN.

In the fourth step, the control signal S_TG is set to low and the illumination phase ILL starts for a relatively long period of time (e.g., about 1 ms-3 ms such as 2 ms). During this time the ADC samples and converts the voltage at the potential node PN to a digital number or digital signal.

After the fourth step, the cycle starts anew with the first step by applying a high potential to the gate of the transfer gate TG via the control S_TG and shorting the sensing node SN to the first reference voltage thereby resetting the pinned photodiode PPD.

In various embodiments the converted output signal may be corrected by taking into account potential measurement errors at the capacitive element Cft and the switches. For example, the second reference voltage can be electrically connected via the second switch Sw2 and the fourth switch Sw4 to the third reference voltage (third switch Sw3 is open at this time) while the transimpedance amplifier TIA is switched off thereby charging the capacitive element Cft. Then the second and fourth switches Sw2, Sw4 are opened, the third switch Sw3 is closed and the amplifier TIA is turned on. This will maintain the potential at the capacitive element Cft created by the third reference voltage minus the second reference voltage. After that, the charges of the pinned photodiode PPN are allowed to transfer to the capacitive element Cft (via the sensing node SN by closing the transfer gate TG).

Other switching arrangement are possible to replace or supplement the third switch Sw3 and the fourth switch Sw4 in order to measure the error of the capacitive element Cft and the switches.

The second reference potential may be set at 1.5 V. Alternatively, the second reference potential may be selected from a potential between 1V and 2 V, inclusive. The third reference potential may be set at 0.2 V. Alternatively, the third reference potential may be selected from a potential between 0.1V and 0.3 V, inclusive.

FIG. 7 shows a ambient light sensing device DIS. The ambient light sensing device DIS comprises island pinned photodiodes PPDs arranged in a grid array. For example, the array may include 128, 256, 512, 1024 or any other number of pinned PPDs. The photodiodes PPD are all connected to a transimpedance amplifier TIA as described with respect to FIG. 5.

The transimpedance amplifier TIA can be a single transimpedance amplifier for all the photodiodes PPDs with a single capacitive element Cft looped around the single transimpedance amplifier TIA. Alternatively, the device DIS can have a plurality of transimpedance amplifiers and a plurality of capacitive elements Cft looped around respectively. The transimpedance amplifier TIA is connected to one or more analog digital converters ADC such as a single 13-bit ADC.

The ambient light sensing device DIS may further include control means CMD which are configured to control the transfer gates TGs of the pinned photodiodes PPDs in the grid array. In various embodiment, the ambient light sensing device DIS should save power. Accordingly, the control means CMD can, besides applying the control signal to the transfer gate TGs, selectively operate the transfer gates TGs by turning them on and off (or activate and deactivate them). The control means CMD measure the ambient light via the pinned photodiodes PPDs.

When the ambient light intensity is low, the control means CMD may decide to turn off a certain number of pinned photodiodes PPDs in the grid because the remaining number of pinned photodiodes PPDs is sufficient to measure the light. If the ambient light increases, the control means CMD may sense that the intensity of the ambient light has increased and current number of activated pinned photodiodes PPDs are not sufficient to measure the light (by showing saturation in the pinned photodiodes PPDs). The control means then activate an additional number of pinned photodiodes PPDs in order to measure the intensity of light. This may be an iterative process where the control means CMD activate more and more pinned photodiodes. In various embodiments, the processes may be reversed and the control means CMD may de-active in successive iterations more and more pinned photodiodes PPD because they are not needed anymore in order to measure the ambient light.

For example, if the array has 512 pinned photodiodes PPD the array can be operated with all transfer gates TGs activated thereby accumulating a gain from 512 diodes PPD at the amplifier TIA. However, the array can also be operated with only half of the transfer gates TGs activated thereby accumulating a gain from 256 diodes PPD at the amplifier TIA. Of course, the control means CMD can activate any desired number of transfer gates TGs of the photodiodes PPD in order to generate a desired gain.

What is claimed is:

1. A method for measuring ambient light, the method comprising:
    successively synchronizing optical signal acquisition phases with extinction phases of a disruptive light source, wherein the disruptive light source periodically provides illumination phases and the extinction phases;
    accumulating, in each acquisition phase, photo-generated charges by at least one photosensitive pixel comprising a pinned photodiode, wherein an area of the pinned photodiode is less than or equal to $1/10$ of an area of the at least one photosensitive pixel;
    transferring, for each pixel, the accumulated photo-generated charges to a sensing node;
    converting, for each pixel, the transferred charges to a voltage at a voltage node; and
    converting, for each pixel, the transferred charges to a digital number.

2. The method according to claim 1, further comprising discharging the at least one pixel of parasitic charges accumulated outside the acquisition phase during a reset at a beginning of each acquisition phase.

3. The method according to claim 2, wherein the reset comprises lowering an electrostatic potential barrier at a transfer gate and connecting the sensing node to a first reference voltage thereby enabling diffusion of the parasitic charges to the first reference voltage.

4. The method according to claim 1, wherein transferring the accumulated photo-generated charges to the sensing node comprises lowering an electrostatic potential barrier of a transfer gate thereby enabling diffusion of the photo-generated charges to the sensing node.

5. The method according to claim 1, wherein transferring the accumulated photo-generated charges further comprising transferring it from the sensing node to an input of a transimpedance amplifier and a capacitive element.

6. An integrated ambient light sensing device comprising:
    at least one photosensitive pixel comprising a pinned photodiode, wherein an area of the pinned photodiode is less than or equal to $1/10$ of an area of the at least one photosensitive pixel;
    a conversion circuit electrically connected to the photosensitive pixel via a sensing node; and
    a controller configured to:
        successively synchronize optical signal acquisition phases with extinction phases of a disruptive light source, wherein the disruptive light source periodically provides illumination phases and the extinction phases;
        accumulate, in each acquisition phase, photo-generated charges by the at least one photosensitive pixel; and
        transfer the accumulated photo-generated charges to the sensing node,
    wherein the conversion circuit is configured to convert the transferred charges to a digital number.

7. The device according to claim 6, wherein the area of the pinned photodiode is less than or equal to $1/100$ of the area of the at least one photosensitive pixel.

8. The device according to claim 6, wherein each pixel includes a transfer gate between the pinned photodiode and the sensing node, and wherein the controller is configured to control the transfer of the photo-generated charges by generating a potential on the transfer gate adapted to lower an electrostatic potential barrier and enable diffusion of the photo-generated charges to the sensing node and then to the conversion circuit.

9. The device according to claim 8, wherein the transfer gate is part of a transistor.

10. The device according to claim 8, wherein the controller is further configured to discharge the at least one pixel of parasitic charges accumulated outside the acquisition phase during a reset at a beginning of each acquisition phase.

11. The device according to claim 6, wherein the conversion circuit comprises a transimpedance amplifier connected to an analog to digital converter, and wherein the transimpedance amplifier is loop around via a loop comprising a capacitive element.

12. The device according to claim 11, wherein the conversion circuit comprises a single transimpedance amplifier with a single capacitive element.

13. The device according to claim 6, wherein the at least one pixel comprises a plurality of pixels arranged in rows and columns.

14. The device according to claim 13, wherein the controller is configured to activate or de-active a transfer gate of each of the pixels.

15. A system comprising:
a light-emitting display screen;
the device according to claim 6; and
a camera,
wherein the light-emitting display screen is the disruptive light source.

16. An integrated ambient light sensing device comprising:
an array of photosensitive pixels, each pixel comprising a pinned photodiode;
a conversion circuit electrically connected to the photosensitive pixels via sensing nodes; and
a controller configured to:
successively synchronize optical signal acquisition phases with extinction phases of a disruptive light source, wherein the disruptive light source periodically provides illumination phases and the extinction phases;
accumulate, in each acquisition phase, photo-generated charges by at least one photosensitive pixel; and
transfer the accumulated photo-generated charges to the sensing node,
wherein the conversion circuit comprises a single transimpedance amplifier looped around by a loop, the loop comprising a single capacitive element, and an analog to digital converter.

17. The device according to claim 16, wherein the controller is configured to activate or de-active a transfer gate of each of the pixels.

18. The device according to claim 16, wherein an area of the pinned photodiode is less than or equal to $\frac{1}{10}$ of an area of the at least one photosensitive pixel.

19. The device according to claim 16, wherein an area of the pinned photodiode is less than or equal to $\frac{1}{100}$ of an area of the at least one photosensitive pixel.

20. A method for measuring ambient light, the method comprising:
successively synchronizing optical signal acquisition phases with extinction phases of a disruptive light source, wherein the disruptive light source periodically provides illumination phases and the extinction phases;
accumulating, in each acquisition phase, photo-generated charges by at least one photosensitive pixel comprising a pinned photodiode;
transferring the accumulated photo-generated charges to an integration node; and
integrating, for each pixel, the transferred charges on the integration node during a series of the successive acquisition phases.

21. An integrated ambient light sensing device comprising:
at least one photosensitive pixel comprising a pinned photodiode;
an integrator circuit electrically connected to the photosensitive pixel via an integration node; and
a controller configured to:
successively synchronize optical signal acquisition phases with extinction phases of a disruptive light source, wherein the disruptive light source periodically provides illumination phases and the extinction phases;
accumulate, in each acquisition phase, photo-generated charges by the at least one photosensitive pixel; and
transfer the accumulated photo-generated charges to the integration node,
wherein the integration node is configured to integrate the transferred charges during a series of the successive acquisition phases.

* * * * *